United States Patent [19]

Hobluigie et al.

[11] Patent Number: 4,927,286
[45] Date of Patent: May 22, 1990

[54] RAPID CONNECTION BETWEEN TWO SHAFTS OR THE LIKE

[75] Inventors: Andre Hobluigie; Jean-Pierre Barnabé, both of Valentigney; Frederic Mouhot, Voujeaucourt, all of France

[73] Assignee: ECIA - Equipements et Composants Pour L'Industrie Automobile, Audincourt, France

[21] Appl. No.: 221,583

[22] Filed: Jul. 20, 1988

[30] Foreign Application Priority Data

Jul. 20, 1987 [FR] France ............... 87 10238
Feb. 11, 1988 [FR] France ............... 88 01651

[51] Int. Cl.⁵ ............................................. F16B 7/00
[52] U.S. Cl. ............................... 403/322; 403/325; 403/328
[58] Field of Search ............. 403/324, 325, 328, 318, 403/322, 359, 317, 383

[56] References Cited

U.S. PATENT DOCUMENTS

| | | | |
|---|---|---|---|
| 1,552,343 | 9/1925 | Quinn et al. | |
| 2,634,991 | 4/1953 | Stevens | 403/383 |
| 3,252,721 | 5/1966 | Weasler | 403/318 |
| 3,260,541 | 7/1966 | Sadler et al. | 403/359 X |
| 3,827,816 | 8/1974 | Knapp et al. | 403/325 X |
| 3,926,532 | 12/1975 | Schlenker et al. | 403/328 X |
| 3,969,033 | 7/1976 | Recker | 403/322 |
| 4,289,414 | 9/1981 | Recker | 403/325 X |
| 4,392,759 | 7/1983 | Cook | 403/317 X |
| 4,430,066 | 2/1984 | Benassi | |
| 4,431,334 | 2/1984 | Cleveland et al. | 403/328 X |
| 4,433,934 | 2/1984 | Cleveland | 403/318 |
| 4,492,292 | 1/1985 | Thor | |
| 4,523,871 | 6/1985 | Recker | 403/322 X |
| 4,579,476 | 4/1986 | Post | 403/322 |

FOREIGN PATENT DOCUMENTS

| | | |
|---|---|---|
| 0092669 | 11/1983 | European Pat. Off. |
| 2032441 | 1/1972 | Fed. Rep. of Germany |
| 2805919 | 6/1979 | Fed. Rep. of Germany |
| 3408857 | 7/1985 | Fed. Rep. of Germany |
| 2131915 | 6/1984 | United Kingdom |

Primary Examiner—Peter M. Cuomo
Attorney, Agent, or Firm—Sughrue, Mion, Zinn, MacPeak & Seas

[57] ABSTRACT

This connection has, on one of two shafts, a hollow socket (1) which is connected to a driving block (16) whose inner surface forms a frustum of a pyramid for receiving a pyramidal head (24) connected to the second shaft. Furthermore, the socket (1) carries retractable pins (6) urged toward the interior by an elastic system (12, 8) but retained in an outer position by an inner ring (14) which is displaced by the elongated stem of the second shaft when it is fitted in the socket. Notches (30) for receiving the pins (6) are provided on the stem (22) and contribute to the axial locking of the two shafts.

5 Claims, 4 Drawing Sheets

RAPID CONNECTION BETWEEN TWO SHAFTS OR THE LIKE

BACKGROUND OF THE INVENTION

It is well known that the assembly of two shafts, or the like, which must be interconnected in axial translation and in rotation, requires not only high precision in the assembly but also the absence of any angular or axial play.

This assembly is usually achieved by means of simple members such as screw-and-nut systems, but these must be placed in well-determined regions and sufficiently tightened, which presents problems when access to the junction between the two members to be assembled is hardly accessible, for example when a universal joint yoke must be mounted on the end of the stem of the gear pinion of a steering box or when a steering wheel must be connected to the steering shaft in a motor vehicle.

SUMMARY OF THE INVENTION

An object of the present invention is to overcome these drawbacks by providing a rapid connection which permits the coupling of two shafts, or like members, by a simple fitting together operation requiring no particular precision and easy to achieve in a minimum amount of space.

The invention therefore provides a rapid connection between two shafts, one of which terminates in a hollow socket and the other in an elongated stem in which the socket comprises, on one hand, a fixed inner block having inclined surfaces for cooperation with corresponding surfaces of a pyramidal head of the stem, and, on the other hand, axial locking pins extending through the wall of the socket and elastically urged inwardly of the socket but retained in a retracted position in the wall so long as the socket is empty, while the stem comprises in the vicinity of said pyramidal head means for unblocking the pins and notches for receiving the pins in the position thereof for axially locking the two shafts to each other.

The cooperation of the inner surfaces of the driving block with the pyramidal head of the stem renders the latter completely connected to the socket in rotation. At the same time, the two members are rendered axially immobile relative to each other by the locking pins and the notches in which they enter. Now, these various immobilizing means are immediately placed in position by the entry of the stem of a shaft inside the socket of the other.

According to another feature of the invention, a conical locking ring slidable on the socket under the action of a spring constantly bears against the outer end of the pins.

There is no risk of the pins moving rearwardly and outwardly and there is no separation of the two assembled members to be feared.

The following description of an embodiment, given by way of a non-limitative example and represented in the accompanying drawings, will show the advantages and features of the invention.

In the drawings:

DETAILED DESCRIPTION OF A PREFERRED EMBODIMENT

Figure 1:
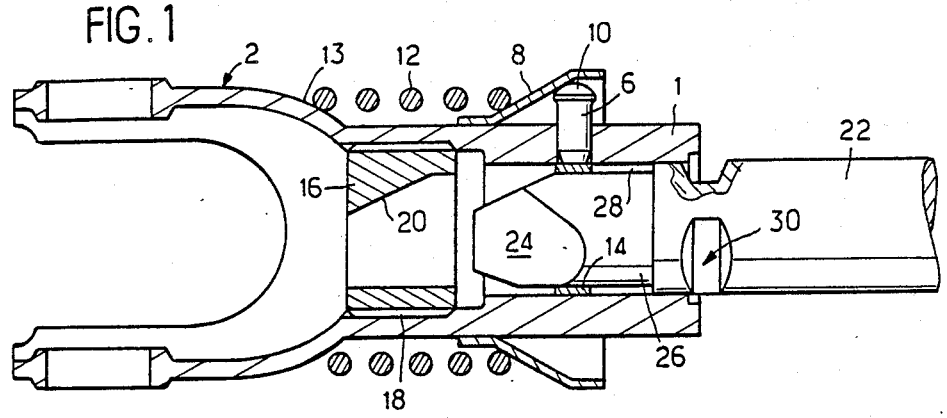
FIG. 1 is a longitudinal sectional view of a rapid connection according to the invention before its complete assembly.
Figure 2:
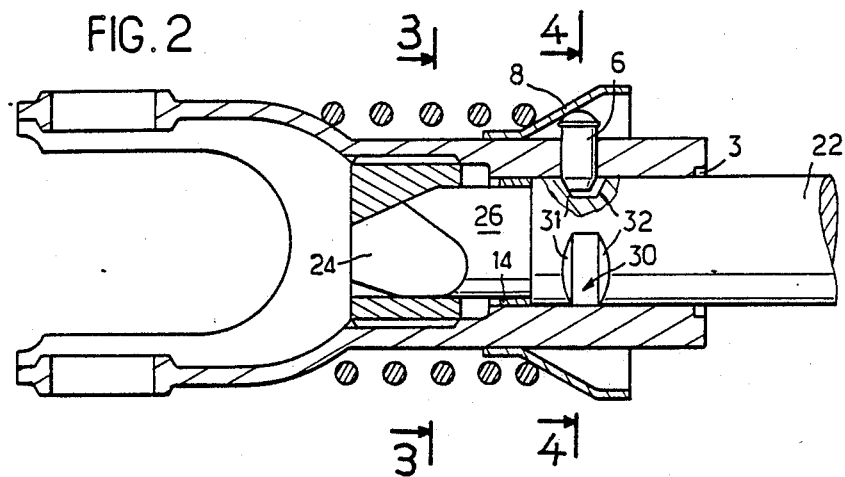
FIG. 2 is a view similar to FIG. 1 of the rapid connection completely engaged.

FIGS. 1 and 2 show a rapid connection interconnecting two shafts, one of which is provided with a universal joint yoke, but it will be clearly seen that this is merely given by way of an example and that the rapid connection of the invention may be used for interconnecting any shafts or any other members.

The shaft 1 terminates in a universal joint yoke 2 and is hollow and forms a subtantially cylindrical socket open at the end 3 thereof and provided with a plurality of apertures 4, three in the illustrated embodiment, which are evenly spaced apart on the circumference of the socket. Mounted in each of these apertures 4 is a locking pin 6 which extends through the wall of the socket. The pins 6 are all urged toward the socket by a frustoconical ring 8 whose large base bears against their head 10 while its small base bears against the outer surface of the socket 1 and is slidable relative to the latter. A coil spring 12 is mounted between the ring 8 and a boss 13 of the socket 1 which, in the illustrated embodiment, is formed by the very branches of the yoke, and tends to bias the ring 8 toward the opposite end of the socket. This force exerted by the spring 12 is however resisted by an inner circular ring 14 which is mounted inside the socket in such manner as to close the apertures 4 and against which the pins 6 abut.

Figure 5:
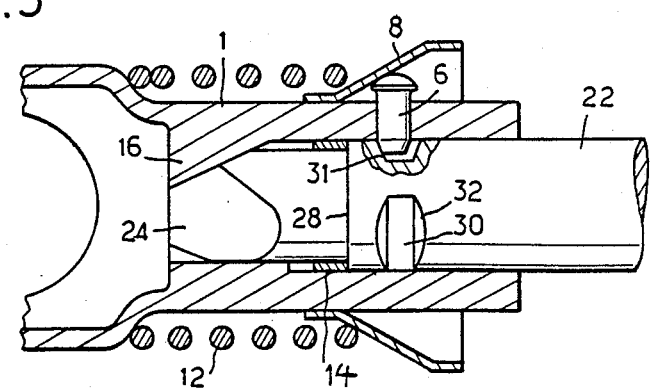
FIG. 5 is a longitudinal sectional view of another embodiment of the invention.
Figure 3:
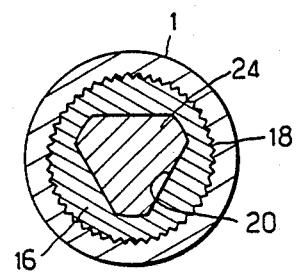
FIG. 3 is a sectional view taken on line 3—3 of FIG. 2.
Figure 4:
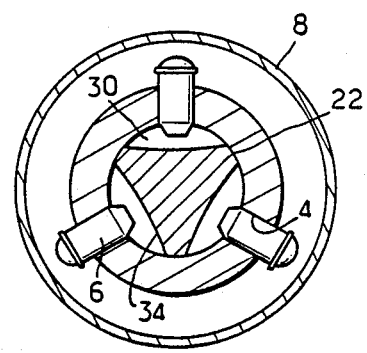
FIG. 4 is a sectional view taken on line 4—4 of FIG. 2.

The socket 1 further contains a driving block 16 which, in the illustrated embodiment, is fixed to the socket by splines 18 but which could itself be assembled by any other means, or even be in one piece with the socket, as shown in FIG. 5. The inner surface of the driving block includes a number of inclined faces 20 substantially defining a frustum of a pyramid whose large base is located in the vicinity of the inner ring 14, while its small base is adjacent to the branches of the universal joint yoke.

The second shaft to be assembled comprises an elongated stem 22 having a substantially cylindrical or prismatic shape which terminates in a pyramidal head 24 having the same number of faces as the frustum of a pyramid of the block 16. The pyramidal head 24 is connected to the body of the stem 2 by a rectilinear portion 26 which forms with the body 22 an outer shoulder 28.

Beyond this shoulder 28, the body 22 has a plurality of notches 30, each occupying a portion of the circumference of the body. These notches are axially defined by flanks 31 and 32 inclined in opposite directions so that they are outwardly divergent.

When it is desired to assemble the shafts or members 1 and 22, it is sufficient to insert the head 24 of the stem 22 inside the socket 1. As shown in FIG. 1, the cylindrical portion 26 of the head passes inside the ring 14, but the shoulder 28 comes to abut against this ring and drives it in the direction toward the block 16. This displacement opens the apertures 4 of the socket and brings the notches 30 in confronting relation to the pins 6 which are immediately urged into said notches by the frustoconical ring 8 which is urged along the socket 1 by the action of the spring 12. The pins 6 are thus firmly immobilized relative to the stem 22 by the combined actions of the conical ring 8, which is urged toward the open end of the socket 1 by the spring 12, and the lateral wall 31 of the notches. No relative axial displacement of these two members is therefore possible.

While the shoulder 28 drives the inner retaining ring 14, the head 24 has entered the interior of the block 16 and each of its faces has come into bearing relation with one of the faces 20 of this block. The head 24 and the driving block 16 are therefore firmly rendered interconnected in rotation. Consequently, when they are in the completely engaged position shown in FIG. 2, the shafts 1 and 22 are firmly interconnected both in rotation and in axial translation with no angular or axial play. Indeed, the pins 6 firmly urge the stem 22 against the faces 20 at the inner end of the block 16 through the slopes 31 and thus take up the clearances or play.

The connection between these two shafts has been obtained by a simple fitting together operation on the stem 22 and the socket 1 with no necessity to present these members in a given precise position relative to each other. Indeed, the peripheral length of the notches 3 is such that the entry of the pins 6 in these notches occurs in a sure manner and at the most may require a very slight angular displacement in one direction or the other. Generally, this angular displacement is moreover brought about by the centering of the faces 24 of the pyramidal head inside the block 16, which centering is effected automatically when these two members are fitted together.

The aforementioned rapid connection can therefore be achieved without any precision by an unqualified personnel and even by means of an automatic system such as a robot, and is particularly adapted for the assembly of shafts or the like at points where they are accessible with difficulty.

Furthermore, it permits a transmission without any angular or axial play between the shafts and automatically ensures the taking up of any possible play upon assembly or in use. It is consequently particularly well adapted to the construction of steering columns.

Figure 9:
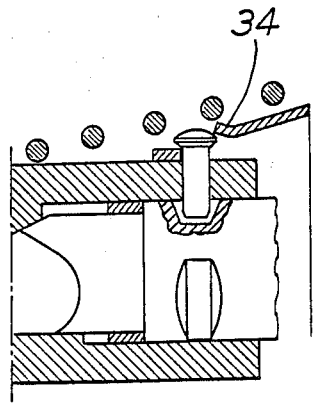
FIG. 9 is a partial longitudinal sectional view of the rapid connection with the ring in the position shown in FIG. 7.
Figure 10:
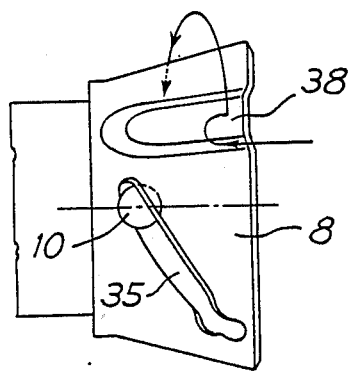
FIG. 10 is a view similar to FIG. 8 of the frustoconical ring in an intermediate position.
Figure 11:
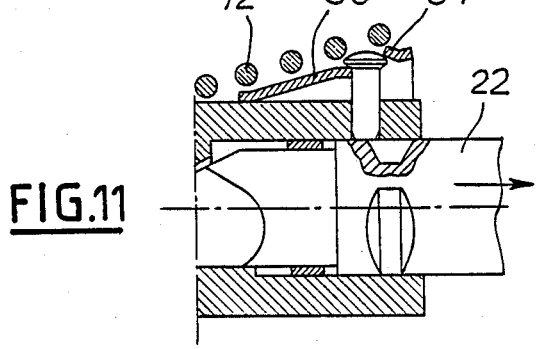
FIG. 11 is a partial longitudinal sectional view of the released connection.

According to a modification shown in FIGS. 6 to 12, the ring 8 comprises, for each of the pins 6, a helical ramp 35 formed by a slot whose upper longitudinal edge 34 and lower longitudinal edge 36 are slightly bent in opposite directions: the upper edge 34 toward the exterior, so as to form an obtuse angle with the remainder of the wall of the ring 8, and the lower edge 36 toward the interior, so as to constitute a slideway substantially parallel to the outer surface of the socket 1. The distance between these two edges 34 and 36 is such that they are capable of fitting on each side of the head 10 of a pin 6, as shown in FIGS. 9 and 11, the lower edge 36 being slipped under the head 10, whereas the edge 34 bears against the latter.

Figure 12:
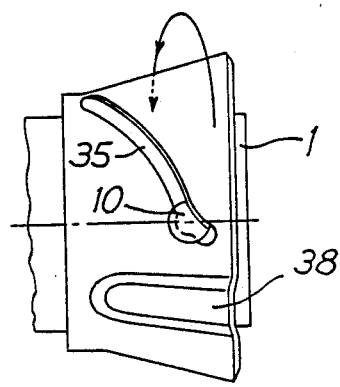
FIG. 12 is a view similar to FIG. 8 of the frustoconical ring in the position for releasing the rapid connection.

When the ramps 35 are fitted in this way on the pins 6 and in particular when, as shown in FIGS. 7 to 10, the ends of the slots 35 adjacent to the small base 40 of the ring 8 are fitted on the pins, a rotation of the ring 8 in the direction indicated by the arrows F in FIGS. 10 and 12 by shifting these slots 35 causes a radial displacement of the pins 6 relative to the socket 1. Indeed, owing to the taper of the ring 8, each lower edge 36 gradually raises the head 10 of the corresponding pin 6, while this pin is maintained strictly parallel to itself by the action of the upper edge 34. The frustoconical ring 8 thus moves from the position shown in FIGS. 7 to 10 in which the pins 6 ensure the locking, to the position shown in FIGS. 11 and 12, in which the pins 6 are strictly withdrawn or retracted from the cavity of the socket 1, i.e. from the notches 30 of the elongated stem 22. In this position, the rapid connection is released; the elongated stem 22 can be withdrawn from the socket 1 by a simple axial displacement.

Preferably, in order to ensure a firm blocking of the pins 6 and facilitate their centering, the wall of the ring 8 is also deformed in confronting relation to each of these pins and defines a longitudinal inner groove 37 which constitutes an outer boss 38. This boss extends from the large base of the ring 8 to the small base thereof, the latter being however extended by a cylindrical annular part 40 which is slidable on the socket 1. At this end, each of the grooves 37 is in the vicinity of a helical ramp 35.

Figure 6:
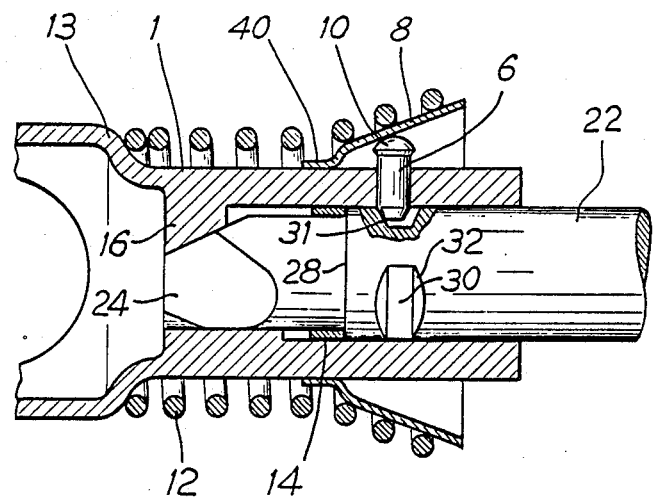
FIG. 6 is a longitudinal sectional view of a completely engaged rapid connection according to a modification.
Figure 7:
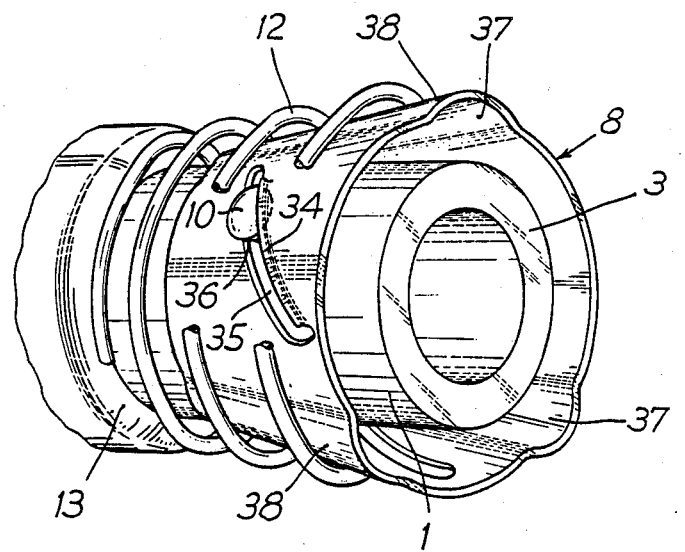
FIG. 7 is a partial elevational view of the rapid connection shown in FIG. 6, the spring having been removed.
Figure 8:
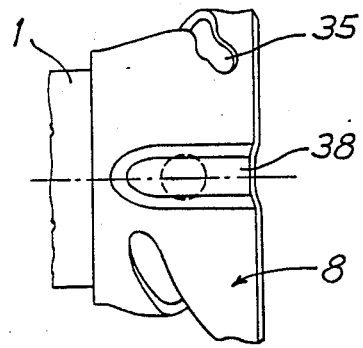
FIG. 8 is a perspective view of the socket, the frustoconical ring being in an intermediate position at the beginning of the unlocking.

In normal utilization of the rapid connection, the pins 6 are not fitted in the slots 35 but blocked within the longitudinal grooves 37 most often at an intermediate point of their length, as shown in FIG. 6. The release of the rapid connection therefore presupposes that an axial force is exerted on the ring 8 in the direction toward the open end 3 of the socket, which is added to the force normally exerted by the spring 12 and shifts this ring 8 until the head 10 of each of the pins 6 is located at the end of the locking groove 37. At this moment, a rotation of the ring 8 around the socket 1 in the direction of arrow F shown in FIGS. 10 and 12, i.e. in the clockwise direction, as viewed in FIG. 6, moves each boss 38 away from the head 10 of the corresponding pin 6 and places the end of the slot 35 in confronting relation to this same pin, so that the edges 34 and 36 of this slot engage on each side of the head 10 in the position shown in FIGS. 9 and 10.

In continuing to rotate the frustoconical ring 8, the slot 35 is then made to slide on the pin 6, which urges the ring 8 in the direction toward the boss 13 of the socket 1, in opposition to the action of the spring 12. As the helical slot 35 is provided in the frustoconical wall of the ring 8, its point of contct with the pin 6 progressively moves away from the socket 1 in the course of the rotation, so that the lower edge 36 pulls on the head 10 and shifts the pin 6 radially relative to the socket 1. Consequently, when the end of the slot 35 comes to abut against this pin 6, the latter is completely retracted inside the wall of the socket 1 and has left the corresponding notch 30. The elongated stem 22 is then released, the locking having been eliminated, and this stem 22 can be withdrawn from the socket 1 by a simple axial displacement thereof.

The locking pins 6 are preferably retained at this end of the slot 35 in a blocking step 42. They can in this way remain retracted within the socket 1 for the required period of time.

When the members 1 and 22 have been once again assembled, the elongated stem 22 is inserted in the socket 1 until the notches 30 are again in confronting relation to the pins 6. It is then sufficient to exert an axial force on the ring 8 in opposition to the action of the spring 12, to disengage the pin from the step 42 and allow the sliding of the edges of the slot 35 along this pin. This permits the action of the spring 12 to be combined with that of the edges of the slot 35 for urging the ring 8 in the outward direction and the pins toward the interior of the socket 1 until they resume the position shown in FIG. 9, i.e. the position in which the pins 6 have been urged through the wall of the socket 1 and have entered the interior of the notches 30 of the stem 22. The ring 8 is in its outermost position. A simple rotation of this ring in the direction opposed to the direction of arrow F can then disengage the slots 35 from the heads 10 and place the latter in confronting relation to the grooves 37, which permits the ring 8 to slide axially along the socket 1 and thus assume the most appropriate position for ensuring an effective locking of the elongated stem 22 and ensure a lateral locking of the ring 8 and the locking pins 6.

The rapid connection can therefore be disassembled and then reassembled each time it is desired by extremely simple operations which may be easily carried out without any particular precision, even if the members to be assembled are located in places which are difficult of access. This disassembly and the assembly of the connection may be remote controlled.

What is claimed is:

1. A rapid connection between two rotary members, such as shafts, having axes of rotation, said connection comprising, on an end of one of said rotary members, a cylindrical hollow socket having a wall defining said hollow of the socket, a cylindrical elongated stem on an end of the other rotary member, a fixed inner drive block having inclined inner faces and being in a fixed position in the socket, a pyramidal end head on the stem and having inclined faces corresponding to and cooperative with said inclined faces of the block, locking pins extending substantially radially through said wall of the socket and movable between an outer position in which the pins are retracted within said wall of the socket and out of said hollow of the socket, and an inner locking position in which the pins extend radially inwardly beyond said wall into said hollow of the socket, means associated with the pins for elastically biasing the pins to said inner locking position, means for retaining the pins in said outer position so long as the socket has not received the pyramidal end head, means on the stem cooperative with the pins for moving the pins to said outer position, and notches in the stem for receiving the pins in said inner locking position for axially locking together the two rotary members and ensuring a connection without any angular or axial play between said rotary members; wherein said means for biasing the pins comprise a frustoconical ring slidably mounted on the socket and a spring for biasing the ring in a direction to cause the ring to bear against outer ends of the pins; and the frustoconical ring is freely rotatable relative to the socket and defines, for each locking pin, a helical ramp, and the pins have a head on which the respective ramp is capable of fitting so that the ramp radially displaces the respective pin relative to the notches of the stem upon rotation of the frustoconical ring relative to the socket.

2. A rapid connection according to claim 1, wherein the frustoconical ring has a wall and each helical ramp is formed by a slot in the wall of the frustoconical ring, each slot being defined by longitudinal edge portions of the wall of the frustoconical ring which are slightly bent in opposite directions and are respectively slidable under and on the head of the respective pin.

3. A rapid connection according to claim 1, wherein the frustoconical ring defines in confronting relation to each locking pin a longitudinal blocking groove.

4. A rapid connection according to claim 3, wherein the frustoconical ring has a small base and each blocking groove terminates in proximity to said small base, said frustoconical ring being extended by a cylindrical annular portion at, said small base thereof.

5. A rapid connection according to claim 3, wherein each of the helical ramps is provided in a space between the blocking grooves and has an end in proximity to said small base and also close to a corresponding end of a respective one of the blocking grooves.

* * * * *